US010525349B2

(12) United States Patent
Nishimaki et al.

(10) Patent No.: US 10,525,349 B2
(45) Date of Patent: Jan. 7, 2020

(54) INFORMATION PROCESSING APPARATUS

(71) Applicant: Sony Interactive Entertainment Inc., Tokyo (JP)

(72) Inventors: Yoichi Nishimaki, Kanagawa (JP); Shinichi Hirata, Kanagawa (JP); Hiroshi Osawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/570,513

(22) PCT Filed: Feb. 12, 2016

(86) PCT No.: PCT/JP2016/054104
§ 371 (c)(1),
(2) Date: Oct. 30, 2017

(87) PCT Pub. No.: WO2016/199451
PCT Pub. Date: Dec. 15, 2016

(65) Prior Publication Data
US 2018/0140950 A1 May 24, 2018

(30) Foreign Application Priority Data
Jun. 12, 2015 (JP) .................................. 2015-119716

(51) Int. Cl.
A63F 13/50 (2014.01)
G06F 3/01 (2006.01)
(Continued)

(52) U.S. Cl.
CPC .............. A63F 13/50 (2014.09); A63F 13/25 (2014.09); A63F 13/28 (2014.09); G06F 3/01 (2013.01);
(Continued)

(58) Field of Classification Search
CPC combination set(s) only.
See application file for complete search history.

(56) References Cited

U.S. PATENT DOCUMENTS 5,949,522 A * 9/1999 Manne .................... A61L 9/122
261/104
5,997,439 A * 12/1999 Ohsuga .............. A63B 71/0622
434/247
(Continued)

FOREIGN PATENT DOCUMENTS

JP 2001000739 A 1/2001
JP 2006292948 A 10/2006
(Continued)

OTHER PUBLICATIONS

International Search Report for corresponding PCT Application No. PCT/JP2016/054104, 3 pages, dated Mar. 15, 2016.
(Continued)

Primary Examiner — James S. McClellan
Assistant Examiner — Kevin M Carter
(74) Attorney, Agent, or Firm — Matthew B. Dernier, Esq.

(57) ABSTRACT

An information processing apparatus that can present smell to a user in an appropriate mode utilizing a smell presentation device is provided. The information processing apparatus acquires content information relating to the substance of a content that includes at least one of video and audio to be presented to the user, and controls the smell presentation device to present smell in a mode according to the acquired content information.

6 Claims, 3 Drawing Sheets

(51) Int. Cl.
*A63F 13/28* (2014.01)
*A63F 13/25* (2014.01)
*G06T 7/70* (2017.01)
*G06K 9/00* (2006.01)

(52) U.S. Cl.
CPC ............ *G06K 9/00255* (2013.01); *G06T 7/70* (2017.01); *G06T 2207/30201* (2013.01)

(56) References Cited

U.S. PATENT DOCUMENTS

| | | | |
|---|---|---|---|
| 2004/0193441 A1* | 9/2004 | Altieri | G06Q 30/02 709/203 |
| 2009/0023554 A1* | 1/2009 | Shim | A63B 22/02 482/4 |
| 2009/0112541 A1 | 4/2009 | Anderson | |
| 2012/0121813 A1* | 5/2012 | Wang | B41J 11/0015 427/401 |
| 2012/0188256 A1* | 7/2012 | Lee | G06T 13/00 345/473 |
| 2013/0038601 A1* | 2/2013 | Han | G06T 13/40 345/419 |
| 2013/0120787 A1* | 5/2013 | Wang | G06K 9/00 358/1.15 |
| 2013/0120788 A1* | 5/2013 | Wang | G06K 9/00 358/1.15 |
| 2013/0204852 A1* | 8/2013 | Han | H04L 67/38 707/693 |
| 2014/0113715 A1* | 4/2014 | Joo | A63F 13/02 463/30 |
| 2015/0241708 A1 | 8/2015 | Watanabe | |

FOREIGN PATENT DOCUMENTS

| | | |
|---|---|---|
| JP | 2007079620 A | 3/2007 |
| JP | 2011502300 A | 1/2011 |
| JP | 2011215462 A | 10/2011 |
| WO | 2009053868 A2 | 4/2009 |
| WO | 2015025511 A1 | 2/2015 |

OTHER PUBLICATIONS

International Preliminary Report on Patentability and Written Opinion for corresponding PCT Application No. PCT/JP2016/054104, 16 pages, dated Dec. 21, 2017.
Extended European Search Report for corresponding EP Application No. 16807158.7, 30 pages, dated Dec. 6, 2018.
Notification of Reason for Refusal for corresponding JP Application No. 2018-116920, 12 pages, dated Jul. 30, 2019.

* cited by examiner

| SMELL INFORMATION OF SMELL OBJECT X ||
|---|---|
| SMELL TYPE | FRUIT |
| SMELL STRENGTH | 3 |
| SMELL RANGE | RADIUS 10 STEP |
| SMELL TRANSFER FLAG | YES |

INFORMATION PROCESSING APPARATUS

TECHNICAL FIELD

The present invention relates to an information processing apparatus, an information processing method, a control program for an information processing apparatus and an information storage medium that control a smell presentation device that presents smell to a user.

BACKGROUND ART

For example, in a video game or the like, it is examined to utilize a smell presentation device that presents specific smell to a user for such an object as to allow the user to have an experience having a more presence.

SUMMARY

Technical Problem

A conventional smell presentation device merely presents determined smell only at a determined timing, and it is not sufficiently examined in what manner smell is to be presented when smell is to be presented to a user together with a content of video or audio.

The present invention has been made in view of such a situation as described above, and it is an object of the present invention to provide an information processing apparatus, an information processing method, a control program for an information processing apparatus and an information storage medium capable of presenting smell to a user in an appropriate mode utilizing a smell presentation device.

Solution to Problem

The information processing apparatus according to the present invention is an information processing apparatus that controls a smell presentation device that presents smell to a user, the information processing apparatus including an acquisition unit configured to acquire content information relating to the substance of a content that includes at least one of video and audio to be presented to the user, and a control unit configured to control the smell presentation device to present smell in a mode according to the acquired content information.

The information processing method according to the present invention is an information processing method for controlling a smell presentation device that presents smell to a user, the information processing method including a step of acquiring content information relating to the substance of a content that includes at least one of video and audio to be presented to the user, and a step of controlling the smell presentation device to present smell in a mode according to the acquired content information.

The program according to the present invention is a program for controlling a smell presentation device that presents smell to a user, the program being for causing a computer to function as acquisition means for acquiring content information relating to the substance of a content that includes at least one of video and audio to be presented to the user, and control means for controlling the smell presentation device to present smell in a mode according to the acquired content information. This program may be stored in and provided together with a computer-readable information storage medium.

DESCRIPTION OF EMBODIMENT

In the following, an embodiment of the present invention is described in detail with reference to the drawings.

Figure 1:
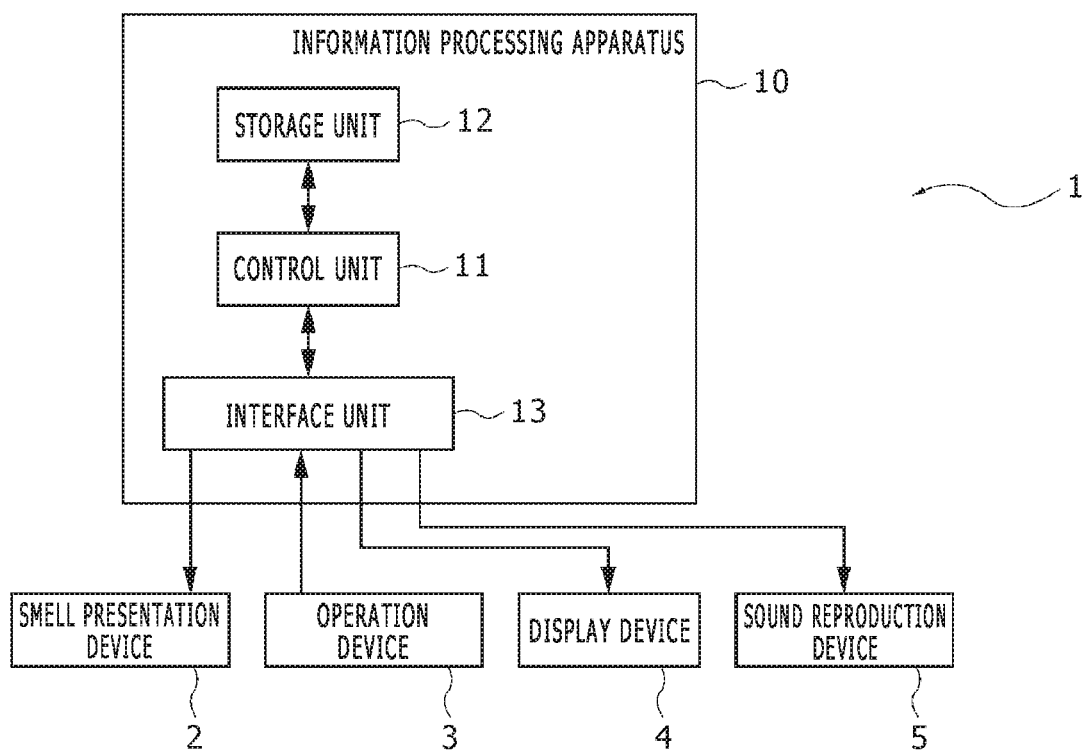
FIG. 1 is an outline view of an entire smell presentation system including an information processing apparatus according to an embodiment of the present invention.

FIG. 1 is a configuration block diagram depicting a configuration of a smell presentation system 1 including an information processing apparatus 10 according to one embodiment of the present invention. As depicted in FIG. 1, the smell presentation system 1 is configured including the information processing apparatus 10, a smell presentation device 2, an operation device 3, a display device 4 and a sound reproduction device 5.

The information processing apparatus 10 may be, for example, a game machine for home use, a portable game machine, a personal computer, a smartphone, a tablet or the like. As depicted in FIG. 1, the information processing apparatus 10 is configured including a control unit 11, a storage unit 12 and an interface unit 13.

The control unit 11 is a central processing unit (CPU) or the like, and executes a program stored in the storage unit 12 to execute various information processes. It is to be noted that a particular example of a process executed by the control unit 11 in the present embodiment is hereinafter described. The storage unit 12 includes a memory device such as a random-access memory (RAM), and stores a program to be executed by the control unit 11 and data to be processed by the program.

The interface unit 13 is a communication interface for transferring various kinds of data among the smell presentation device 2, the operation device 3, the display device 4 and the sound reproduction device 5. The information processing apparatus 10 is connected to the smell presentation device 2, the operation device 3, the display device 4 and the sound reproduction device 5 through the interface unit 13 by wire communication or wireless communication.

The smell presentation device 2 is a device for presenting smell to a user, and releases perfume such that the user senses a specific smell. In the present embodiment, the smell presentation device 2 is configured such that a plurality of cartridges in which perfumes individually having specific smells are filled are removably mounted thereon. The smell presentation device 2 releases perfume filled in a specific cartridge in response to a control signal from the information processing apparatus 10. Consequently, the smell presentation device 2 can present a plurality of types of smells corresponding to the plurality of cartridges to the user. Further, by exchanging a cartridge attached to the smell presentation device 2, a variety of smells greater than the number of cartridges that can be mounted on the smell presentation device 2 at the same time can be presented to the user. As a particular example, cartridges capable of being mounted on the smell presentation device 2 may be those that release various kinds of smells such as smells of food (fruit, coffee, curry, meat and so forth), smells of environments (soil, turf, wood, a library, a hospital and so forth), smells of things (gunpowder, blood, a beast, sweat, cologne, a machine, garbage and so forth), a sweet smell, and a spicy smell.

The smell presentation device 2 may be structured such that it can be mounted on the body (head or the like) of the user. In this case, if perfume is released in the proximity of the nose of the user, then the user can sense the smell clearly. Alternatively, the smell presentation device 2 may be built in a housing of the information processing apparatus 10. Alternatively, the smell presentation device 2 may be installed fixedly in a room in which the user is present independently of the information processing apparatus 10. Alternatively, the smell presentation device 2 may include wheels, a driving mechanism and so forth so as to be capable of traveling on the floor. With such configurations as described above, the place to which the smell presentation device 2 releases perfume can be changed in response to the control of the information processing apparatus 10.

The smell presentation device 2 can release perfume in a cartridge by various methods. In particular, the smell presentation device 2 may spread the perfume in the cartridge in mist by a spray or the like. Further, where the smell presentation device 2 is mounted on the body of the user, the smell presentation device 2 may soak perfume in the cartridge into a liquid absorption material capable of absorbing liquid (filter paper or the like) and move the liquid absorption material to the proximity of the nose of the user such that the smell of the perfume vaporized from the liquid absorption material is presented to the user. It is to be noted that the smell presentation device 2 may adjust the amount of the perfume to be released or adjust the distance of the liquid absorption material in which perfume is soaked to the user to control the strength of the smell to be presented to the user. In particular, when it is desired to cause the smell to be sensed more strongly by the user, the smell presentation device 2 may increase the amount of the perfume to be released or may move a liquid absorption material in which the perfume is soaked to the more proximity of the nose of the user.

The operation device 3 is a device for accepting an operation input from the user, and inputs a signal indicative of the accepted operation substance of the user to the information processing apparatus 10. The operation device 3 may be, for example, a controller, a keyboard or the like for a game machine for home use. Further, the operation device 3 may include buttons or the like disposed on the surface of a housing of the information processing apparatus 10.

The display device 4 is an organic electroluminescence (EL) display unit, a liquid crystal display unit or the like, and displays video according to a video signal outputted from the information processing apparatus 10 on the screen thereof. The display device 4 may be a device of the type used by the user mounting the device on the head of the user like a head-mounted display unit. Further, the display device 4 may be configured integrally with the housing of the information processing apparatus 10.

The sound reproduction device 5 is a speaker or the like and issues sound according to an audio signal outputted from the information processing apparatus 10. The sound reproduction device 5 may be a device of a type used by the user mounting the device on the ear of the user like a headphone. Further, the sound reproduction device 5 may be built in the housing of the information processing apparatus 10.

Figure 2:
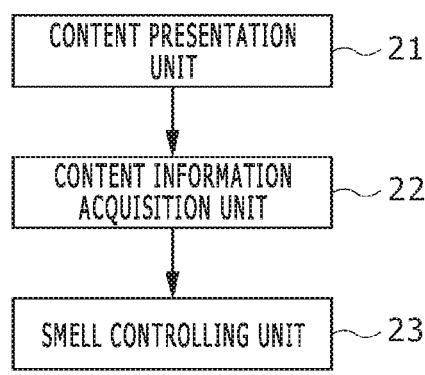
FIG. 2 is a functional block diagram depicting functions of the information processing apparatus according to the embodiment of the present invention.

In the following, functions implemented by the information processing apparatus 10 are described with reference to FIG. 2. As depicted in FIG. 2, the information processing apparatus 10 functionally includes a content presentation unit 21, a content information acquisition unit 22 and a smell controlling unit 23. The functions are implemented by the control unit 11 executing a program stored in the storage unit 12. This program may be provided to the information processing apparatus 10 through a communication network such as the Internet or may be stored in and provided together with a computer-readable information storage medium such as an optical disk.

The content presentation unit 21 presents a content including at least one of video and audio to the user. In particular, the content presentation unit 21 presents a content by controlling the display device 4 to display video on the screen of the display device 4 or controlling the sound reproduction device 5 to reproduce sound. The content to be presented by the content presentation unit 21 may be video or audio, for example, of a game implemented by a game program. Alternatively, the content may be video or audio stored in a computer-readable information storage medium such as an optical disk or may be video or audio transmitted from the outside to the information processing apparatus 10 by broadcasting, streaming distribution or the like. Further, the content to be generated by the content presentation unit 21 and presented to the user may include video indicative of a state in a virtual space in which a virtual object is disposed.

The content information acquisition unit 22 acquires information relating to the substance of a content presented by the content presentation unit 21 (such information is hereinafter referred to as content information). In particular, the content information acquisition unit 22 acquires content information to be used to implement control of the smell by the smell controlling unit 23 hereinafter described. A particular example of the substance of content information and smell control according to the content information is hereinafter described.

The smell controlling unit 23 controls the smell presentation device 2 to present smell to the user in a mode according to content information. In particular, the smell controlling unit 23 determines from which one of a plurality of cartridges mounted on the smell presentation device 2 perfume is to be emitted, at which timing the perfume is to be emitted, at which strength the smell is to be presented and so forth, and outputs a control signal for causing the smell presentation device 2 to act in accordance with the determined substance. By the smell presentation device 2 acting in accordance with the control signal, a smell of the type according to the substance of the content can be presented at a timing and a strength according to the substance of the content to the user.

In the following, particular examples of control of the smell presentation device 2 according to the substance of a content are described.

First, as a first example, an example in which smell of a virtual object disposed in a virtual space is presented to a user is described. In this example, the content presentation unit 21 generates video indicative of a state within the virtual space in which virtual objects are disposed and controls the display device 4 to display the video on the screen of the display device 4. Further, smell information is set in association with at least some virtual objects disposed in the virtual space. In the following description, a virtual object to which smell information is set is referred to as smell object.

Figures 3, 4A:
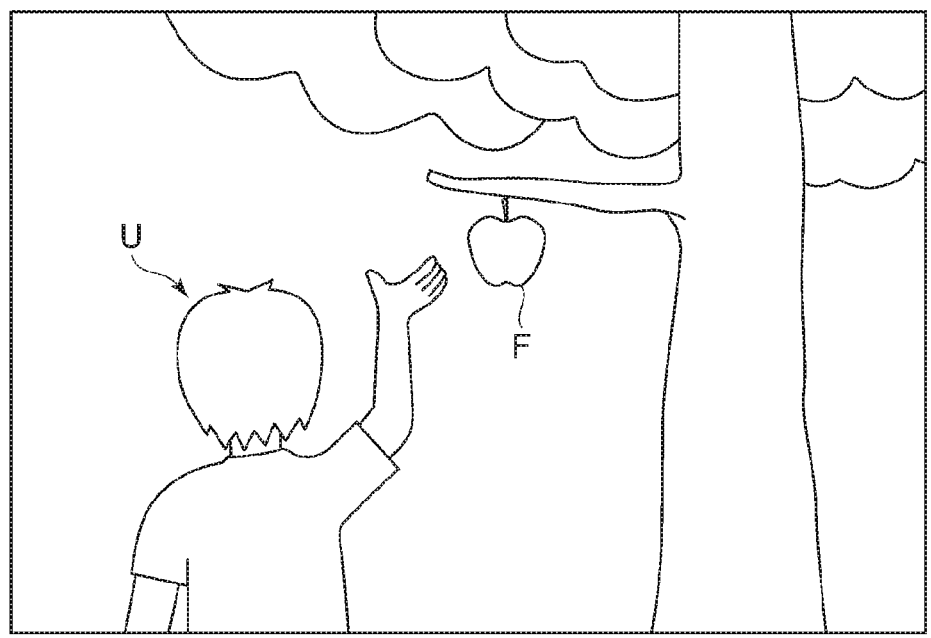
FIG. 3 is a view depicting an example of smell information.
FIG. 4A is a view depicting an example of an image indicating a state of a virtual space in which a smell object is disposed.

FIG. 3 illustrates an example of the smell information set in association with one smell object. In the example of FIG. 3, the smell information includes values of a smell type, a smell strength, a smell range and a smell transfer flag. Further, in addition to the smell information, information of a shape or an appearance and information of the position in the virtual space are set to the smell object. Here, the smell type is information indicative of what smell is emitted from the smell object. The smell type may be information that specifies a type of a cartridge to be mounted on the smell presentation device 2. The smell strength is information indicative of a degree of the strength of the smell to be emitted from the smell object to the surroundings. The smell range is information indicative of a range over which the smell of the smell object reaches in the virtual space. Although the smell range may be a circular range determined by a numerical value of a distance, it may otherwise be a non-circular range determined in response to the orientation of the smell object. In particular, for example, the distance over which the smell reaches in front of the smell object and the distance over which the smell reaches in the rear of the smell object may be different from each other. Further, the smell range may not be set individually to each smell object but may be set automatically in response to the smell strength. The smell transfer flag is information indicative of whether or not the smell a smell object has is transferred to a different object.

Further, in the virtual space, a smell reference position is set which makes a reference when smell is to be presented to the user. This smell reference position may coincide with the viewpoint position that makes a reference when an image indicative of a state in the virtual space is to be generated. Alternatively, the smell reference position may be the disposition position of a specific object disposed in the virtual space. The specific object in this case may be an object of a character that makes an avatar of the user in the virtual space (such object is hereinafter referred to as user object U). In any case, it is assumed that the smell reference position moves in the virtual space in response to an operation input to the operation device 3 by the user. For example, if the user object U is disposed in the virtual space and the viewpoint position moves in the virtual space in an interlocking relationship with the position of the user object U, then the user can browse a state at an arbitrary position in the virtual space by operating the user object U to move in the virtual space. At this time, if the position of the user object U is set as the smell reference position, then also the smell reference position moves in the virtual space in response to the operation of the user.

In this first example, smell of a smell object assumed to reach the smell reference position in the virtual space is presented to the user. The content information acquisition unit 22 for implementing such control as just described acquires the position and smell information of the smell object and information of the smell reference position. Then, the content information acquisition unit 22 determines a timing at which the smell is to be presented to the user in response to a positional relationship between the smell reference position and the smell object in the virtual space. In particular, the content presentation unit 21 updates the smell reference position in the virtual space and the position of each virtual object in response to an operation input of the user or the like after every predetermined interval of time (for example, after every updating interval of a frame image to be displayed on the screen of the display device 4). The content information acquisition unit 22 acquires the smell reference position and the position of the smell object after updated as well as the smell information of the pertaining smell object. Then, the content information acquisition unit 22 decides whether or not the smell reference position has advanced into the smell range set to the smell object. If the smell reference position has advanced into the smell range, then the smell controlling unit 23 instructs the smell presentation device 2 to present a smell corresponding to the smell type set to the smell object to the user. Since the smell corresponding to the smell object is presented to the user in this manner, for example, even if the smell object is not included in a video image indicative of a state in the virtual space presented by the content presentation unit 21, it can be conveyed to the user that a smell object exists in the proximity of the smell reference position.

At this time, the strength of the smell to be presented to the user by the smell presentation device 2 may be determined in response to the smell strength set to the smell object and the distance between the smell object and the smell reference position. In particular, the smell controlling unit 23 controls such that, as the smell strength set to the smell object increases and as the distance between the smell object and the smell reference position decreases, a stronger smell is presented to the user.

It is to be noted that, if a plurality of smell objects are disposed in the virtual space and smell ranges of them overlap with each other, then the smell reference position may possibly advance simultaneously into the smell ranges set to the plurality of smell objects. In such a case as just described, the smell controlling unit 23 may instruct the smell presentation device 2 such that smells set individually to the plurality of smell objects are presented simultaneously or may instruct the smell presentation device 2 to present only the smell of the smell object that is to present the strongest smell to the user.

Further, the smell information may include a smell map indicative of a smell distribution on the surface of the smell object. In this case, the smell information is described as a two-dimensional map image, in which information of a smell type or a smell strength is set to each pixel, in a data structure similar to that of a texture map or a bump map indicative of an appearance of a virtual object. According to such a technique as just described, it is possible for smell to be had only by a specific location of a smell object having some size or for different locations to have different types of smells. In this case, the smell controlling unit 23 synthesizes the smell information at the locations to determine a type and a strength of smell that is to reach the smell reference position and controls the smell presentation device 2 in response to the determined substance.

Further, the smell transfer flag included in the smell information indicates whether or not the smell is transferred to a different virtual object. For example, a case in which two virtual objects including a first object and a second object contact with each other in a virtual space is supposed. Here, it is assumed that smell information is set to the first object and the smell transfer flag in the smell information has a value of YES (namely, a value indicating that the smell is transferred). On the other hand, it is assumed that, in an initial state, no smell information is set to the second object. In the present example, when the first object and the second object contact with each other, the content presentation unit 21 decides whether or not smell transfer occurs. Here, since the smell transfer flag of the first object is YES, it is decided that smell transfer occurs. Consequently, to the second object to which no smell information is set till then, smell information having a smell type same as that of the first object is set. At this time, the smell strength of the second object may be determined in response to the smell strength or the smell type of the first object, a period of time for which the objects remain in contact with each other and so forth. Alternatively, as the smell information, an index value indicative of an ease of smell transfer may be set to the first object, and the smell strength of the second object may be determined in response to the index value. Further, the smell strength of the second object may decrease together with lapse of time after the first object and the second object are brought out of contact with each other. Further, where the second object is a smell object to which smell information is set from the beginning, to the second object, such smell information indicating that both smells exist in a mixed state as a result of smell transfer may be set. Alternatively, only the smell that indicates a higher smell strength may be set as the smell information to the second object.

It is to be noted that the substance of the smell information including the smell transfer flag may be changed in response to an event that occurs with the smell object. For example, although a fruit such as an apple originally has smell, it is considered that the smell is not transferred to an article if the article is only contacted with the fruit. However, if pressure is applied to crash the fruit or the like, then fruit juice may adhere to a different article to cause smell transfer. Therefore, in order to reproduce such a phenomenon as just described also in a virtual space, when such an event that pressure is applied to a smell object occurs, the content presentation unit 21 changes the shape of the smell object and changes the value of the smell transfer flag from NO (namely, a value indicating that smell transfer does not occur) to YES. Further, at this time, also various kinds of smell information set to a smell object other than the smell transfer flag may be updated together such that the smell strength of the smell object is raised or the smell type is changed.

Further, where a smell map indicative of a smell distribution on the surface of a smell object is set to the smell object as described hereinabove, also the smell transfer flag may be set to each pixel in the smell map. In this case, such control can be performed that, if a specific location of the smell object is contacted by a different virtual object, then smell transfer occurs, but if a different location is contacted, no smell transfer occurs.

Figure 4B:
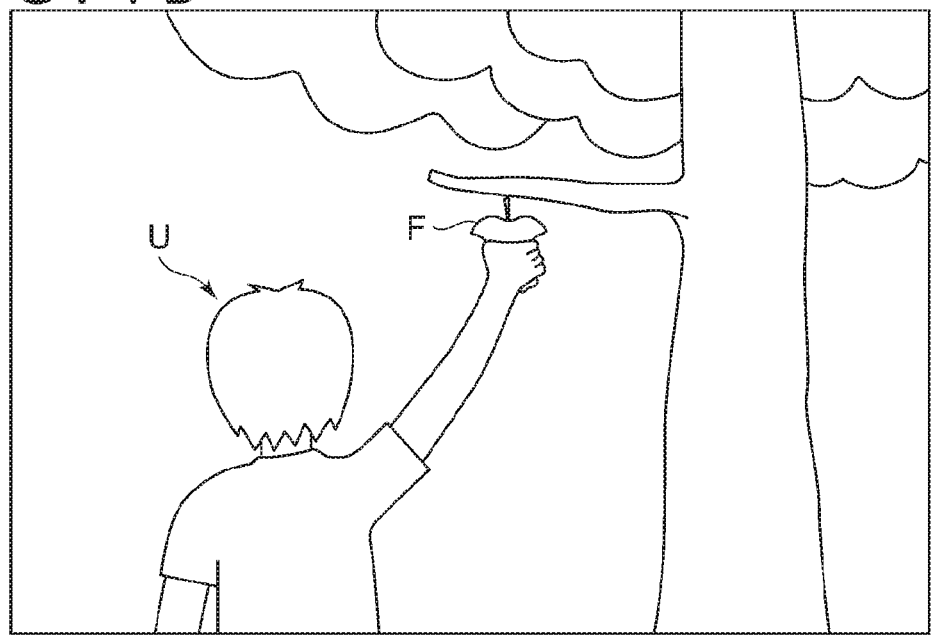
FIG. 4B is a view depicting an example of an image indicating another state of a virtual space in which a smell object is disposed.

FIGS. 4A and 4B are views illustrating a manner in which smell transfer occurs. FIG. 4A illustrates a state of a virtual space in which a fruit object F representative of a fruit and a user object U are disposed. Here, although smell information is set to the fruit object F, the smell transfer flag in the smell information is NO. Therefore, even if the user operates the user object U to contact the fruit object F with a hand of the user object U, no smell transfer occurs. Here, if the user performs an operation for crashing the fruit by a hand of the user object U as depicted in FIG. 4B, then the smell transfer flag of the fruit object F is updated from NO to YES. Further, since, in this state, the fruit object F and a portion of the hand of the user object U contact with each other, smell transfer to the portion of the hand occurs, and smell information of a type same as that of the fruit object F is newly set to the portion of the hand. Even if, in this state, the user object U moves out of the smell range set to the fruit object F, since the smell of the type same as that of the fruit object F is set to the hand of the user object U, the smell controlling unit 23 instructs the smell presentation device 2 to present the smell of the fruit to the user. Especially, where smell information that designates a comparatively small smell range is set to the portion of the hand, the smell controlling unit 23 controls the smell presentation device 2 to present the smell set to the portion of the hand to the user only when the user moves the hand of the user object U to the proximity of the head of the user object U. Consequently, the user can really experience the smell transfer occurring in the virtual space.

Further, the smell controlling unit 23 may control the direction in which the smell is to be released as viewed from the user in response to a positional relationship between the smell object and the smell reference position. Such control can be performed in the smell presentation device 2 that controls a smell emitting source. Further, in the present example, it is assumed that an orientation (with which direction the forward direction of the user coincides) is set at the smell reference position. The orientation of the smell reference position may coincide with a gaze direction set in the virtual space or may be the front direction of the user object U. For example, if the orientation of the smell reference position coincides with the orientation of the user object U in a state in which the display exemplified, for example, in FIG. 4A is given, then the fruit object F positioned in the rightward direction with respect to the orientation of the smell reference position. At this time, if the smell set to the fruit object F can be presented, also in the real world, to the user from the rightward direction, then the phenomenon in the virtual space can be experienced more really by the user.

In order to implement such control as described above, a plurality of smell presentation devices 2 may be connected to the information processing apparatus 10. In particular, if a smell presentation device 2 that emits perfume from the rightward direction of the user and another smell presentation device 2 that emits different perfume from the leftward direction are installed, then the smell controlling unit 23 can present smell emitted from one of the leftward and rightward directions to the user by instructing one of the two smell presentation devices 2 to emit its perfume. Further, when a smell object exists in the front direction of the smell reference position, the smell may be presented from both of the left and right smell presentation devices 2. Alternatively, a smell presentation device 2 may be installed not only on the front side but also on the rear side of the user such that, when a smell object exists in front or in the rear of the smell reference position, the smell is presented by those smell presentation devices 2. Further, where each smell presentation device 2 can move the position thereof as described hereinabove, the smell controlling unit 23 may control the smell presentation device 2 so as to present the smell after the smell presentation device 2 is moved to a position that is determined in response to the position of the smell object.

Furthermore, even where only one smell presentation device 2 is available and the position of the smell presentation device 2 is fixed, it is possible to present a direction in which smell is to be released in the virtual space to the user. In this case, the smell presentation system 1 includes a sensor for detecting the orientation of the face of the user. Such a sensor as just described may be a motion sensor such as a gyroscope built in a device that is mounted on the head of the user like, for example, a head-mounted display. Alternatively, the sensor may be a camera installed at a position at which a video image around the head of the user can be picked up. By analyzing a face image of the user included in the image picked up by such a camera as just described, the orientation of the user can be specified. In the present example, when a smell object exists in the rightward direction with respect to the orientation of the smell reference position, for example, the smell controlling unit 23 presents the smell set to the smell object at a timing at which the user is directed to the rightward direction but stops the presentation of the smell when the user is directed to the leftward direction. Alternatively, although the smell is presented irrespective of the orientation of the face of the user, the strength of the smell may be changed in response to the orientation of the face of the user. In this case, if the face of the user is directed to an orientation corresponding to the direction of the smell object as viewed from the smell reference position in the virtual space, then smell relatively stronger than that when the face of the user is directed to any other orientation is released. According to such control, by presenting smell in an interlocking relationship with the orientation of the face of the user, the orientation in which the smell is emitted from the single smell presentation device 2 can be conveyed to the user.

Although, in the foregoing description, a smell type included in smell information designates a specific cartridge, the smell set to a smell object may be a composition of a plurality of basic smell components. In this case, the smell information of the smell object includes a value designating a strength of each of the plurality of smell components in place of a smell type and a smell strength described hereinabove. The smell presentation device 2 has mounted thereon cartridges that correspond to the smell components, and the smell controlling unit 23 instructs the smell presentation device 2 to release perfume of the smell components designated by the smell information of the smell object at strengths individually designated by the smell information.

Further, it is assumed that, in the foregoing description, the timing at which smell is to be presented to the user is controlled in response to the positional relationship between the smell reference position, which moves in the virtual space in response to the operation of the user, and a smell object. However, the smell may be presented to the user when the position of a smell object in the virtual space satisfies a condition determined in advance such as when the smell reference position does not change in the virtual space or when the smell object merely advances into a predetermined region in the virtual space.

Further, smell may be presented to the user at a timing at which an event determined in advance occurs with a smell object such as at a timing at which the smell object starts release of smell. As a particular example, where an object that releases smell representative of a pot is disposed in a virtual space, the smell controlling unit 23 may start presentation of smell according to smell information set to the smell object at a timing at which the user instructs an operation for opening the lid of the pot. Alternatively, when the smell reference position advances into a predetermined region in the virtual space, the smell controlling unit 23 may present smell associated with the region (smell of the environment) to the user irrespective of the smell object.

Further, when some event occurs with the user object U that is an operation target of the user, smell determined in advance may be presented to the user. For example, where the content presentation unit 21 executes a game process, a change occurs with the user object U (namely, the user character) in response to the substance of the game. Specific smell may be presented to the user in response to such a change as just described. In particular, when an event by which the physical fitness of the user character recovers occurs in a game, the smell controlling unit 23 may present a smell that has a relaxation effect or a refreshing effect on its user to the user. Conversely, when an event by which the user character gets injured or is placed into an abnormal state occurs in a game, smell that causes a user to feel uncomfortable may be presented to the user.

Now, a second example of control of the smell presentation device 2 according to the substance of a content is described. In this example, it is assumed that the content presented by the content presentation unit 21 includes video. The content information acquisition unit 22 analyzes, while the content presentation unit 21 presents video to the user, the video on the real time basis to detect an image of a specific pattern included in the video. Then, if the content information acquisition unit 22 detects an image of the specific pattern, then the smell controlling unit 23 instructs the smell presentation device 2 to present smell of a type determined in advance in an associated relationship with the pattern. As a particular example, if it is detected that meat is shown in video, then the smell controlling unit 23 presents smell of meat to the user. On the other hand, if an image in which a color of a predetermined hue range (green or the like) is included at a predetermined ratio or more is detected, then smell of wood may be presented to the user. Alternatively, the content information acquisition unit 22 may analyze the substance of a character string such as a telop displayed in video to detect a keyword determined in advance from within the character string. In this case, if a specific keyword is detected, then the smell controlling unit 23 presents smell of a type determined in advance in an associated relationship with the keyword to the user. Alternatively, the content information acquisition unit 22 may detect a specific character appearing in video. In this case, if the character appears in the video, then smell associated with the character is presented. By presenting, when a result of the analysis of video satisfies a predetermined condition, smell corresponding to the result of the analysis in this manner, even if information for designating a type of smell or a presentation timing of smell is not added to a content in advance, smell conforming to the substance of the content can be presented to the user.

It is to be noted here that, although analysis of video is performed on the real time basis during display of video, where video data is stored in the storage unit 12 in advance, the content information acquisition unit 22 may perform analysis of video data before display of the video is started to determine a type of the smell to be presented to the user and a presentation timing of the smell. In this case, the smell controlling unit 23 presents corresponding smell to the user at a timing at which an image of a specific pattern detected already is displayed on the screen after the content presentation unit 21 starts display of the video.

Subsequently, a third example of control of the smell presentation device 2 according to the substance of the content is described. Also in the present third example, smell to be presented to the user is determined on the basis of a result of analysis of the substance of a content similarly as in the second example. In the present example, it is assumed that the content presented by the content presentation unit 21 includes audio, and the content information acquisition unit 22 analyzes, while the content presentation unit 21 is reproducing audio, the audio on the real time basis to detect a keyword determined in advance from within the audio. Such detection of a keyword can be implemented using a known audio recognition technology. The smell controlling unit 23 instructs the smell presentation device 2 to present smell of a type determined in advance in an associated relationship with the keyword detected by the content information acquisition unit 22. For example, if a keyword "curry" is included in the audio, then the smell controlling unit 23 presents smell of curry to the user. Consequently, even if a type or a presentation timing of smell is not determined in advance, smell according to the substance of the content can be presented to the user at a timing conforming to the substance of the content similarly as in the second example. It is to be noted that, similarly as in the second embodiment, also in the third example, detection of a keyword may not be performed on the real time basis, but smell may be presented during reproduction of audio using a result of analysis performed for audio data stored in the storage unit 12 in advance.

Now, a fourth example of control of the smell presentation device 2 according to the substance of a content is described. In this fourth example, the content information acquisition unit 22 does not analyze the substance itself of a content but acquires related information of the content provided to the information processing apparatus 10 separately from data of the content. Here, the related information of a content may be document information describing the substance of the content, caption information where the content is a broadcasting program, program table data or the like. Similarly as in the third example, the content information acquisition unit 22 detects a specific keyword from within the related information. Then, the smell controlling unit 23 presents, while the content presentation unit 21 remains presenting the content, a smell determined in advance in an associated relationship with the detected keyword to the user.

It is to be noted that the plurality of particular examples of the smell control according to content information described above may be used in suitable combinations. For example, where a content including both video and audio is presented to the user, the smell controlling unit 23 may present smell to the user on the basis of content information obtained as a result of analysis of each of the video and the audio.

With the information processing apparatus 10 according to the present embodiment described hereinabove, since a timing at which smell is to be presented to a user, a type or a strength of the smell to be presented, a direction and so forth are determined in response to the substance of a content, even if the substance or the timing of the smell presented finely by a producer of the content is not designated, a smell of an appropriate type can be presented at an appropriate timing to the user who views the content.

REFERENCE SIGNS LIST

1 Smell presentation system, 2 Smell presentation device, 3 Operation device, 4 Display device, 5 Sound reproduction device, 10 Information processing apparatus, 11 Control unit, 12 Storage unit, 13 Interface unit, 21 Content presentation unit, 22 Content information acquisition unit, 23 Smell controlling unit

The invention claimed is:

1. An information processing apparatus that controls a smell presentation device that presents smell to a user, the information processing apparatus comprising:
   an acquisition unit configured to acquire content information relating to the substance of a content that includes video indicative of a state of a virtual space in which a smell object that is an object representative of an article having smell and with which smell information that specifies at least one of a type of the smell and a strength of the smell is associated is disposed; and
   a control unit configured to control the smell presentation device to present smell in a mode according to the smell information included in the acquired content information, wherein:
   the control unit controls the smell presentation device to present smell at a timing that is determined in response to a distance between a position of the smell object and a reference position, which moves in response to an operation of the user is set in the virtual space, and
   the control unit controls the smell presentation device to present the smell with a strength that is determined in response to a distance between the reference position and the smell object wherein:
   flag information indicative of whether or not smell transfer occurs is associated with the smell object, and
   when the flag information of the smell object is in the affirmative and a different virtual object disposed in the virtual space, and initially having no smell associated therewith, is brought into contact with the smell object, the smell of the smell object is transferred to the different virtual object such that the different virtual object has the smell associated therewith.

2. The information processing apparatus according to claim 1, wherein
   the smell presentation device is configured to be capable of presenting a plurality of types of smells, and
   the control unit controls the smell presentation device to present smell of a type specified by information that specifies a type of smell associated with the smell object.

3. The information processing apparatus according to claim 1, wherein the control unit controls the smell presentation device to present smell with a strength that is determined in response to information that specifies a strength of smell associated with the smell object.

4. The information processing apparatus according to claim 1, wherein
   flag information indicative of whether or not smell transfer occurs is associated with the smell object, and
   when a different virtual object disposed in the virtual space is brought into contact with the smell object, if the flag information indicating that smell transfer occurs is associated as the flag information with the smell object, then the different smell object is changed to a new smell object.

5. An information processing method for controlling a smell presentation device that presents smell to a user, the information processing method comprising:
   acquiring content information relating to the substance of a content that includes video indicative of a state of a virtual space in which a smell object that is an object representative of an article having smell and with which smell information that specifies at least one of a type of the smell and a strength of the smell is associated is disposed; and
   controlling the smell presentation device to present smell in a mode according to the smell information included in the acquired content information, wherein:
   the controlling includes controlling the smell presentation device to present smell at a timing that is determined in response to a distance between a position of the smell object and a reference position, which moves in response to an operation of the user is set in the virtual space, and
   the controlling includes controlling the smell presentation device to present the smell with a strength that is determined in response to a distance between the reference position and the smell object, wherein:
   flag information indicative of whether or not smell transfer occurs is associated with the smell object, and when the flag information of the smell object is in the affirmative and a different virtual object disposed in the virtual space, and initially having no smell associated therewith, is brought into contact with the smell object, the smell of the smell object is transferred to the different virtual object such that the different virtual object has the smell associated therewith.

6. A non-transitory, computer readable storage medium containing a computer program, which when executed by a computer causes the computer to control a smell presentation device that presents smell to a user, via actions, comprising:

acquiring content information relating to the substance of a content that includes video indicative of a state of a virtual space in which a smell object that is an object representative of an article having smell and with which smell information that specifies at least one of a type of the smell and a strength of the smell is associated is disposed; and controlling the smell presentation device to present smell in a mode according to the smell information included in the acquired content information, wherein:

the controlling includes controlling the smell presentation device to present smell at a timing that is determined in response to a distance between a position of the smell object and a reference position, which moves in response to an operation of the user is set in the virtual space, and the controlling includes controlling the smell presentation device to present the smell with a strength that is determined in response to a distance between the reference position and the smell object, wherein:

flag information indicative of whether or not smell transfer occurs is associated with the smell object, and when the flag information of the smell object is in the affirmative and a different virtual object disposed in the virtual space, and initially having no smell associated therewith, is brought into contact with the smell object, the smell of the smell object is transferred to the different virtual object such that the different virtual object has the smell associated therewith.

* * * * *